TEST-SIGNAL GENERATOR PRODUCING OUTPUTS OF DIFFERENT FREQUENCIES AND CONFIGURATIONS FROM FLIP-FLOPS ACTUATED BY SELECTIVELY PHASED PULSES

Filed Oct. 31, 1961 2 Sheets-Sheet 1

INVENTOR
D.L. FAVIN
BY
Charles Scott Phelan
ATTORNEY

INVENTOR
D.L. FAVIN
BY
Charles Scott Phelan
ATTORNEY

United States Patent Office 3,188,486
Patented June 8, 1965

3,188,486

TEST-SIGNAL GENERATOR PRODUCING OUTPUTS OF DIFFERENT FREQUENCIES AND CONFIGURATIONS FROM FLIP-FLOPS ACTUATED BY SELECTIVELY PHASED PULSES

David L. Favin, Whippany, N.J., assignor to Bell Telephone Laboratories Incorporated, New York, N.Y., a corporation of New York Filed Oct. 31, 1961, Ser. No. 149,043
22 Claims. (Cl. 307—88.5)

Figures 1, 1A:
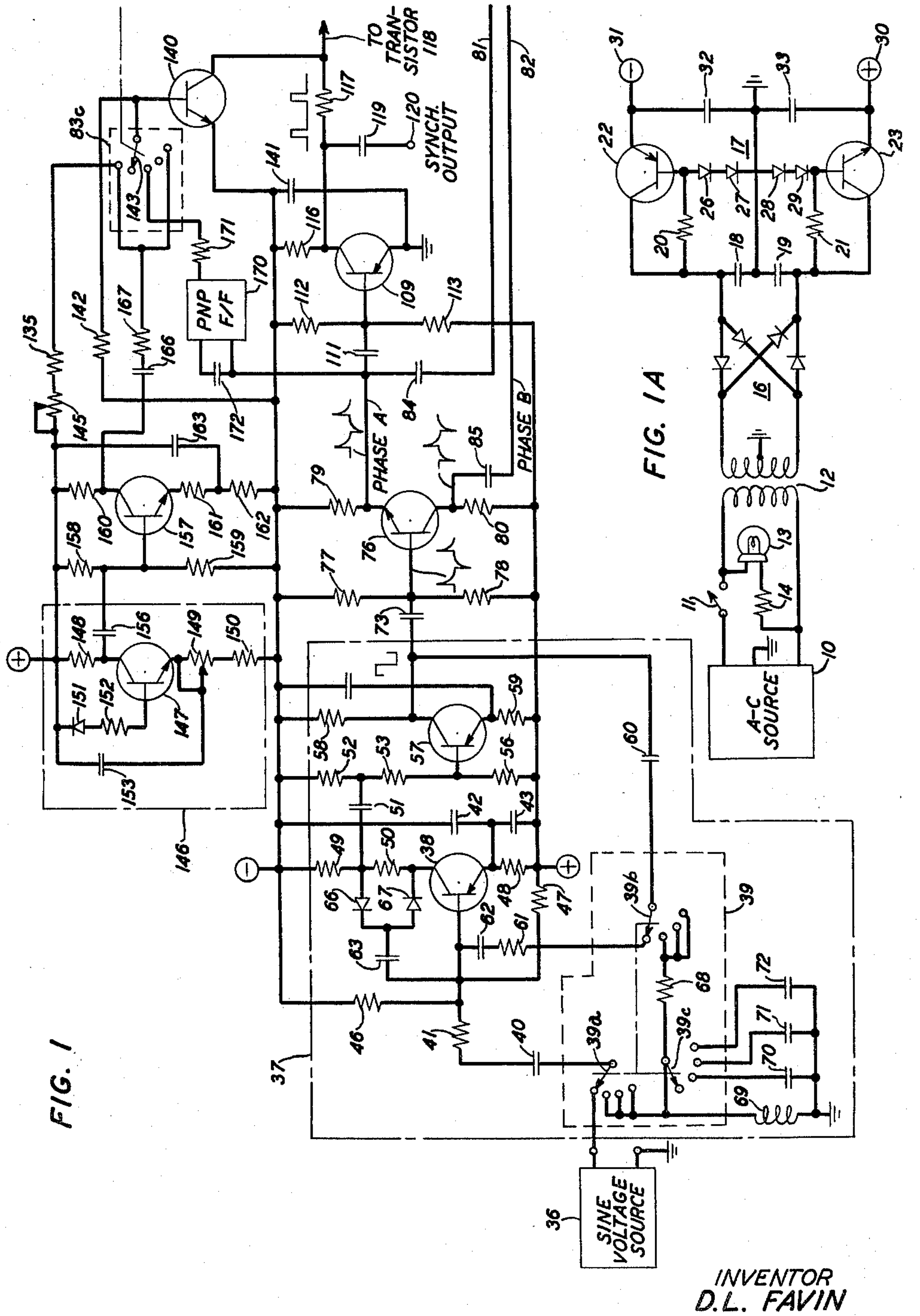

This invention relates to a test signal generator which is particularly suitable for testing data transmission systems.

In data processing and transmitting systems data is represented by consecutive information bits arranged in different permutations of a predetermined code to represent letters, numbers, or other information characters. Each bit in a binary coded system is represented by the presence or absence of some type of signal and may typically be designated "mark" or "space" depending upon whether the signal is present or absent. Such signals are also sometimes designated "ONE" or "ZERO." Usually the signal is a voltage pulse with a predetermined amplitude characteristic, but during processing or transmission the pulse may be converted into a different form for a particular system purpose. One signal form which has been used in oscillation bursts of different frequencies for marks and spaces, and systems utilizing such a form are called frequency shift systems.

Different systems have used different data bit rates, and any one system may also use more than one type of data bit representation. In most systems, however, the data appears at some point in the system as either one of two types of amplitude variant signal pulse representations because such representations are most convenient for translation between electric representations of data bits and the corresponding information characters.

One common type of amplitude variant signal is a signal in which a certain one of the data bits, for example the mark, is always represented by a pulse with a predetermined minimum voltage amplitude excursion at any one circuit point in a single excursion direction with respect to a reference voltage such as ground. The other binary data bit type, the space, is then always represented by the absence of such a voltage excursion. This amplitude variant signal type is hereinafter designated "a unipolar signal" because each bit type is always represented by a signal excursion of one polarity.

The other common type of amplitude variant signal includes for one bit type a voltage amplitude excursion that may be in either direction with respect to the voltage reference level. The other bit type is then always represented by the absence of any such excursion. This type of signal is hereinafter designated "a bipolar signal" because each bit type may be represented by a signal excursion of either polarity.

In systems which use either unipolar or bipolar signals, transmission and processing equipment may be evaluated by a bidiameter type of instrument, as described in my Patent No. 3,041,540 which issued June 26, 1962. Variably located samples of successively received data bits are counted in a bidiameter to determine the degree of data bit distortion in a quantitative manner. A versatile test signal generator for a system which is to be tested by the use of a bidiameter must be able to generate either unipolar or bipolar signals and it must be able to operate at the particular bit frequency which is used by any system that is to be tested.

It is, therefore, one object of the invention to utilize a minimum amount of equipment for generating plural test signals that are capable of use with many different data systems.

Another object is to utilize a single set of circuits for producing test signals of different frequencies and different configuration types.

A further object is to utilize a single oscillatory circuit which is capable of being sychronized to a wide range of frequencies for producing at any one of the frequencies a variety of different test signals.

Still another object is to produce in response to an input signal of widely variable amplitude and frequency an output test signal including pulses of selectable different configurations, each configuration being constant in spite of such input signal variables except that the repetition frequency of the test signal is dependent upon the input signal frequency.

These and other objects of the invention are realized in an illustrative embodiment wherein clock signals from a data system which is to be tested are received by a clutched oscillator of the type described in my Patent No. 3,049,675 which issued August 14, 1962. The clutched oscillator locks its operation to the clock frequency and produces square output pulses at that frequency with substantially constant rise time and amplitude regardless of clock signal amplitude and frequency variations. From the square wave, contraphasal trains of spaced positive-going and negative-going pulses are derived and utilized to operate two bistable circuits having complementary triggering characteristics. The combined outputs of the two bistable circuits comprise the desired test signal which may be amplified and utilized as generated, or converted to a balanced signal prior to utilization. Switchable connections are also provided for enabling the clutched oscillator to operate independently at any one of a number of predetermined frequencies.

A salient feature of the invention is the use of a clutched oscillator to extract frequency information from an input oscillation signal wave and the further utilization of the frequency information to produce trains of spaced pulses for controlling the operation of two bistable circuits having complementary triggering characteristics. The bistable circuit outputs are combined to produce an output signal wave with a configuration which is a function of the manner in which the spaced pulses are utilized to drive the bistable circuits.

Another feature of the invention is that selected pulses from plural, differently phased, pulse trains are utilized for setting and resetting two flip-flop circuits using transistors of opposite conductivity types. The combined outputs of the flip-flop circuits make up pulse waves of different configurations, which configurations are functions of the manner in which the differently phased pulses are selected to actuate the flip-flop circuits.

It is a further feature of the invention that two flip-flop circuits, with the outputs thereof combined into a single output circuit, are selectively driven by different pulse trains so that the combined output is either unipolar or bipolar in accordance with the manner of trigger pulse selection.

Still another feature of the invention is that pulses for driving two flip-flop circuits may be readily selected in such a way as to produce a predetermined information content or to produce a random information content at the combined outputs of the flip-flop circuits.

Yet another feature of the invention is that the use of a clutched oscillator to couple oscillations to the inputs of two flip-flop circuits makes it possible to obtain a predetermined type of combined signal output configuration from the flip-flop circuits even though the drive signals to the clutched oscillator may vary in frequency over several orders of magnitude and may be subject to substantial variations in input amplitude.

Figure 2:
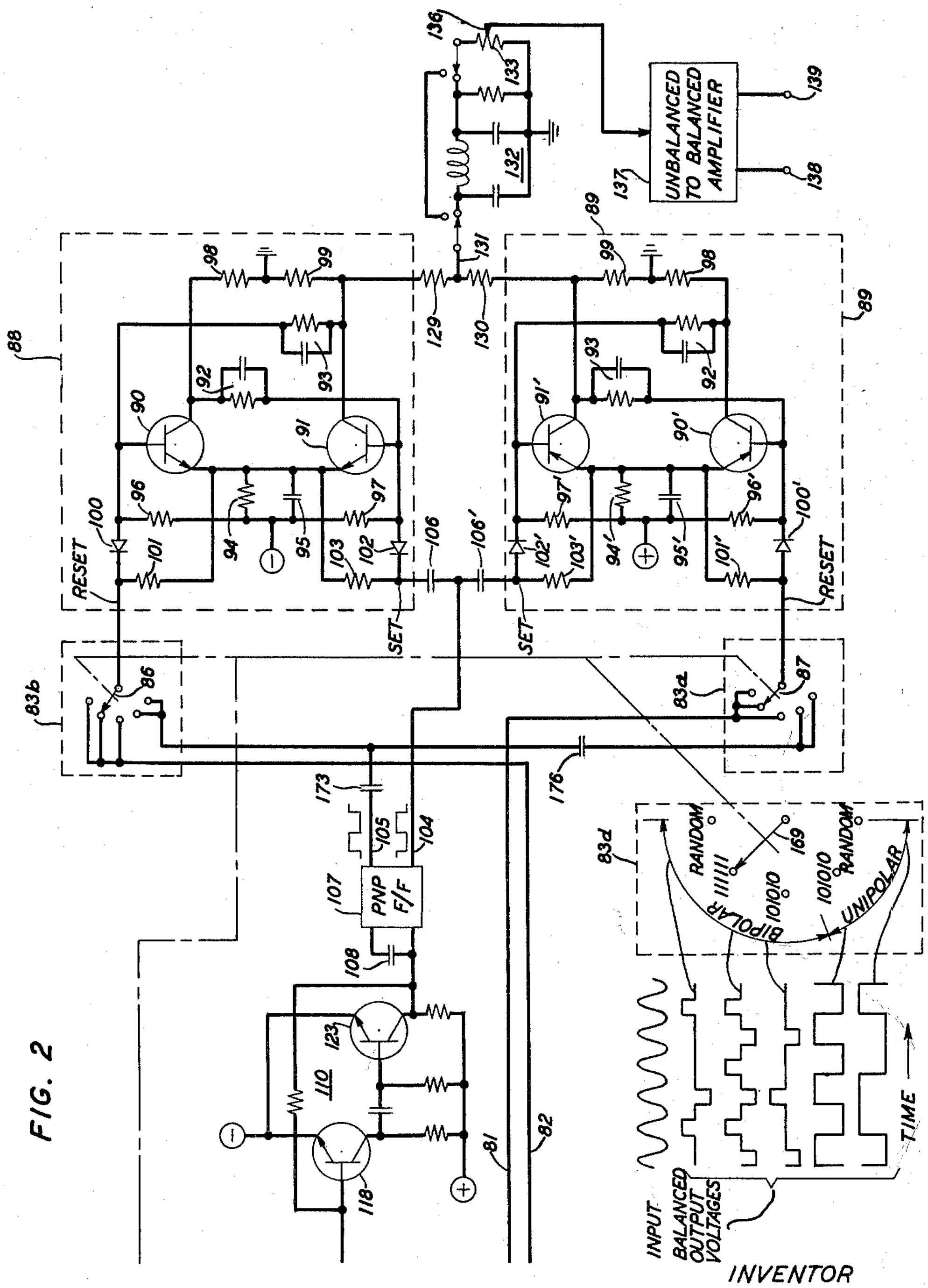

A better understanding of the invention and its various features, objects, and advantages may be obtained upon a consideration of the following detailed description, and the appended claims, in connection with the attached drawing, in which:

FIGS. 1, 1A, and 2 represent a composite schematic diagram of a test signal generator in accordance with the invention when FIGS. 1 and 2 are placed side by side with FIG. 1 on the left.

Operating potential for the circuit is obtained from a source 10 of alternating current in FIG. 1A. The output of source 10 may be balanced with respect to ground and applied through a switch 11 to the primary winding of a transformer 12. A power indicating lamp 13 is connected in series with a resistor 14 across the primary winding.

A grounded center tap is provided for the secondary winding of transformer 12 and terminal voltages of the secondary winding are applied through a full wave rectifier bridge 16 to a voltage regulating circuit 17. Two capacitors 18 and 19 are connected in series across the output terminals of bridge 16 and co-operate with resistors 20 and 21 to form a balanced, low-pass, smoothing filter. Transistors 22 and 23 are series regulating elements and have their collector and base electrodes connected across resistors 20 and 21, respectively. The base electrode of transistor 22 is connected to ground and to the common terminal between capacitors 18 and 19 by a pair of diodes 26 and 27, which are poled for forward conduction in the same direction as the emitter-base junction of the transistor. In a similar fashion, the base electrode of transistor 23 is connected to ground through a pair of diodes 28 and 29, which are poled for conduction in the same direction as the base-emitter junction of transistor 23.

Transistor 23 is an n-p-n transistor and is arranged so that positive output voltage appears at a supply terminal 30 connected to its emitter electrode. This terminal is shown as a circled plus sign and in the remaining circuits of FIGS. 1 and 2 connections to the terminal 30 are indicated by similar circled plus signs. Similarly, the p-n-p transistor 22 has its emitter electrode connected to a supply terminal 31 represented by a circled minus sign and connections to terminal 31 in FIGS. 1 and 2 are indicated by circled minus signs.

Capacitors 32 and 33 are connected between ground and the emitter electrodes of transistors 22 and 23, respectively, for providing transistor bias adjustment in response to changes in source voltage. Thus, if the source voltage should drop, there is a tendency for the voltages at terminals 30 and 31 to decrease. Such tendency is offset by a decrease in the charge on capacitors 32 and 33, which reduces the back bias between the base and emitter electrodes of transistors 22 and 23 and thereby holds terminals 30 and 31 at their proper voltages.

In FIG. 1 a source 36 of sinusoidal voltage signals has its output connected to the input of a clutched oscillator 37. The signals from source 36 may represent clock signal oscillations supplied by a data system which is to be tested. These signals may be subject to variations in average amplitude and may occur at any frequency within a predetermined limiting range. Some factors governing the exact value of the frequency are the stability of source 36 and the data bit rate of the system which is being tested. Oscillator 37 provides substantially uniform rectangular output pulses with a constant amplitude and a constant rise time which are unaffected by the particular frequency of signals applied to the oscillator input. The frequency of these rectangular pulses corresponds to the frequency of signals applied to the oscillator input even though such input signals may drift in frequency during operation.

Oscillator 37 is of the general type disclosed in my aforementioned Patent No. 3,049,675. It includes a first common emitter amplifier stage with a p-n-p transistor 38. Input signals are applied to the base electrode of transistor 38 from source 36 through a selector arm 39*a* of a three-deck selector switch 39 and through a capacitor 40 and a resistor 41. Capacitors 42 and 43 are connected in series between the positive and negative supply terminals and have their common terminal coupled to the emitter electrode of transistor 38 for bypassing alternating currents around emitter resistor 48 to prevent degeneration. A resistive potential divider including resistors 46 and 47 is connected in series between the supply terminals and has the common terminal between the two resistors connected to the base electrode of transistor 38 for providing at that electrode a no-signal bias potential which is negative with respect to the transistor emitter electrode. Thus, transistor 38 is normally biased conducting in the absence of positive-going input signals from source 36 which are of sufficient amplitude to back bias the emitter-base junction of the transistor. Resistor 48 connects the emitter electrode of transistor 38 to the positive supply terminal, and two series-connected resistors 49 and 50 connect the collector electrode of the transistor to the negative supply terminal.

A coupling capacitor 51 applies the output of the first amplifier stage from the common terminal of resistors 49 and 50 to the common terminal of two additional resistors 52 and 53. The latter resistors are connected in series with a resistor 56 between the positive and negative supply terminals for establishing a normal base electrode potential for a transistor 57 in a second common emitter amplifier stage of clutched oscillator 37. Resistors 58 and 59 connect the collector and emitter electrodes, respectively, of transistor 57 to the negative and positive supply terminals. Resistors 52, 53, and 56 are so proportioned that transistor 57 is normally biased conducting in the absence of positive-going input signal peaks coupled thereto through capacitor 51. Thus, when transistor 38 changes from a non-conducting to a conducting condition a positive-going pulse is coupled to the base electrode of transistor 57 and biases that transistor into its nonconducting condition for the duration of the pulse. A negative-going pulse results at the collector electrode of transistor 57.

A positive feedback connection is provided in clutched oscillator 37 and includes a capacitor 60 connected in series with switch selector arm 39*b* and a series connected resistor 61 and capacitor 62. This feedback path couples regenerative signals from the collector electrode of transistor 57 to the base electrode of transistor 38, and tends to produce sustained oscillations at that collector electrode. Positive feedback connections also tend to produce output pulses with a fast rise time which is independent of the frequency of input signals supplied from source 36.

A negative feedback path is provided from the collector electrode of transistor 38 to the base electrode of the same transistor through a capacitor 63 and two diodes 66 and 67. Diode 66 is connected in series with capacitor 63 between the common junction of resistors 49 and 50 and the base electrode of transistor 38. Diode 67 is similarly connected between the collector electrode of transistor 38 and the common terminal of diode 66 and capacitor 63. Resistors 49, 50, and 48 are proportioned so that when transistor 38 is conducting the diodes 66 and 67 are biased nonconducting by the potential difference developed across resistor 50. Since transistor 38 normally conducts in the absence of positive input signals, capacitor 63 charges to a voltage which is equal to the potential difference between the base electrode of transistor 38 and the mid-point of resistor 50.

When signals are applied to clutched oscillator 37, corresponding signal excursions appear at the terminals of resistor 50. If an amplified signal from transistor 38 attains a sufficient positive-going amplitude, diode 66 is biased into conduction and completes a negative feedback path to the base electrode of the transistor for limiting further positive-going signal excursion. Similarly, an excessive negative-going excursion of amplified signals from transistor 38 biases diode 67 into conduction for limiting further negative-going change in the signal coupled to transistor 57. These limiting functions cause the output pulse train at the collector electrode of transistor 57 to be flat-topped with a uniform pulse amplitude regardless of input signal amplitude changes as long as limiting diodes 66 and 67 are operative.

Oscillator 37 has the type of clutching characteristics which are described in my patent 3,049,675. Its output signal frequency can follow an input signal frequency variation over a large range. It was found, for example, that the clutched oscillator circuit 37 was able to track input signals over a range of at least several orders of magnitude, such as from 20 bits per second to 600 kilobits per second.

Switch 39 is provided in the circuit of oscillator 37 since in some applications it is desirable that the circuit should be able to oscillate independently in a stable manner at some predetermined frequency. Thus, if the selector arms 39*a*, *b*, and *c* of switch 39 are operated in a counterclockwise direction from the positions illustrated, they cause source 36 to be disconnected and bring about a revision in the positive feedback connection of clutched oscillator 37. In this new connection, positive feedback capacitor 60 is connected in series with selector arm 39*b*, a resistor 68, selector arm 39*a*, capacitor 40, and resistor 41. A shunt branch of the positive feedback connection includes a coil 69 and three capacitors 70, 71, and 72. Coil 69 is connected between selector arm 39*c* and ground, and one of the capacitors 70–72 may be connected by selector arm 39*c* in parallel with coil 69 to form a resonant circuit for fixing the frequency of oscillator 37. Thus, this oscillator may produce output pulses of a predetermined configuration at the frequency of a given input synchronizing signal, or it may produce output pulses of the same configuration at its own selected stable frequency.

Output pulses from oscillator 37 are differentiated by a capacitor 73 and the base input resistance of an n-p-n transistor 76, which is connected to oscillator 37 through the capacitor. Potential dividing resistors 77 and 78 are arranged to establish at the base electrode of transistor 76 a no-signal bias condition which places the transistor in a linear portion of its operating characteristic. This transistor is adapted to function as an inverter and includes load resistors 79 and 80 which connect the emitter and collector electrodes thereof to the negative and positive supply terminals, respectively. Thus, contraphasal versions of the differentiated output pulses from clutched oscillator 37 appear at the emitter and collector electrodes of transistor 76. For convenience of references, the pulses appearing at the emitter electrode are designated "phase A" and those appearing at the collector are designated "phase B."

The two output pulse trains from inverter transistor 76 are applied by leads 81 and 82 to different decks of another selector switch 83. Switch 83 is provided with three switching decks 83*a*, *b*, and *c* with rotatable selector arms ganged together for tandem operation. An indicator panel 83*d* is also provided, and its selector arm is ganged for operation with the switching decks so that an operator may tell at a glance what type of output to expect for each position of the switch. The phase A pulses are applied to the deck 83*a* through a coupling capacitor 84, and the phase B pulses are applied to the switch deck 83*b* through a capacitor 85.

In the switch position shown in the drawing, selector arms 86 and 87 of switch 83 couple the phase B and phase A pulses to input connections of two transistor bistable multivibrator circuits 88 and 89, respectively. The multivibrator, or flip-flop, circuit 88 includes two n-p-n transistors 90 and 91, which have their base and collector electrodes cross-coupled in the usual manner by parallel-connected resistor-capacitor circuits 92 and 93. Emitter electrodes of the transistors are connected together and to the negative supply terminal through a resistor 94 and a bypass capacitor 95. The base electrodes of these transistors are connected through resistors 96 and 97 to the negative supply terminal while the collector electrodes are connected through resistors 98 and 99 to ground. The base electrode of transistor 90 is connected to the emitter electrode of the same transistor by a diode 100 arranged in series with a resistor 101. Diode 100 is poled for forward conduction from the base to the emitter electrode of the transistor 90. In a similar manner, a diode 102 is connected in series with a resistor 103 between the base and emitter electrodes of transistor 91.

Diodes 100 and 102 in flip-flop 88 are poled so that they can couple from the flip-flop circuit inputs to the base electrodes of their respective transistors only those input pulses which tend to bias the conducting transistors into their nonconducting condition. Resistors 101 and 103 are provided to hold the cathodes of diodes 100 and 102 at the same potentials as the corresponding transistor emitter electrodes to restrict the potential swing at those cathodes to a narrow range. With such resistors in the circuit insufficient potential difference is developed across the base-emitter junction of the conducting transistor to bias the corresponding diode into conduction, but the diode is just on the brink of conduction. Only a very small negative-going input pulse is required to make the diode conduct. Accordingly, it is possible to employ much weaker input signals than would be required otherwise, since the input signal need be of only sufficient amplitude to bring a conducting transistor out of its saturated conduction condition; and thereafter the normal multivibrator regenerative action completes the triggering operation for the circuit.

Multivibrator 89 is similar to multivibrator 88 except that it employs p-n-p transistors 90′ and 91′ and has its emitter electrodes connected through a resistor 94′ and a capacitor 95′ to the positive supply terminal instead of the negative supply terminal. Diodes 100′ and 102′ are also reversed with respect to their corresponding diodes in multivibrator 88 to perform in a similar manner with respect to the p-n-p transistors of multivibrator 89.

For convenience of reference, the common terminal of diode 100 and resistor 101 is designated the reset input of the flip-flop 88 and is connected to selector arm 86 of switch deck 83*b*. The common terminal of diode 102 and resistor 103 constitutes the set input of the flip-flop and is connected through a capacitor 105 to an output lead 104 of a p-n-p flip-flop circuit 107. In a like manner the set input of flip-flop 89 is also connected to lead 104, and the reset input is connected to selector arm 87.

Different triggering signal variations for flip-flops 88 and 89 may be produced in response to the phase A pulses in a manner which will be described. Phase A pulses are coupled through a pulse amplifier transistor 109, a trigger circuit 110, and the flip-flop 107 to the flip-flops 88 and 89. A capacitor 111 couples the phase A inverter pulses to the base electrode of transistor 109. This transistor is normally biased nonconducting, in the absence of negative-going phase A pulses, by the potential dividing action of resistors 112 and 113. The emitter electrode of transistor 109 is connected to ground, and its collector electrode is connected through a resistor 116 to the negative supply terminal. Phase A pulses drive transistor 109 into saturated conduction and appear at its collector electrode as amplified pulses with rectangular configuration. These rectangular pulses are applied through a resistor 117 to the input base electrode of a transistor 118 in the trigger circuit 110. In addition, the amplified phase A pulses may be coupled out through a capacitor 119 to a terminal 120 for providing a synchronizing signal, if required, for an oscilloscope in a bidiameter or for any other purpose.

N-p-n transistor 118 and another n-p-n transistor 123 are connected in a monostable trigger circuit of a conventional arrangement wherein transistor 123 is normally conducting in the single stable conduction condition. Each rectangular pulse from transistor 109 actuates trigger circuit 110 to drive transistor 118 into conduction for a predetermined constant time interval. Flip-flop 107 is operated by the pulses of uniform amplitude and duration which are received from trigger circuit 110.

Flip-flop 107 is essentially the same as the flip-flop 89, but its two input connections are coupled together through a capacitor 108 so that all input signals to the flip-flop are applied to both input connections. Capacitor 108 blocks direct currents so that the operations of the input circuit diodes in flip-flop 107 do not interfere with one another.

The leading edge of each positive-going pulse on output lead 104 of flip-flop 107 is coupled through capacitor 106′ and diode 102′ to reduce conduction in transistor 91′ and thereby initiate a triggering operation in flip-flop circuit 89. Similarly, the trailing edge of the same pulse represents a negative-going voltage transition and is coupled through capacitor 106 and diode 102 to reduce conduction in transistor 91 and initiate a triggering action for flip-flop circuit 88. Each of the voltage transitions at lead 104 is caused by a different one of the negative-going phase A impulses from inverter transistor 76.

All phase A pulses are also applied to the reset input of flip-flop 89, as previously described, when switch 83 is set in the position illustrated; and the positive-going ones of those pulses tend to transfer conduction from transistor 90′ to transistor 91′. The negative-going phase A pulses have no effect at the reset input to this flip-flop because they are blocked by diode 100′. Similarly, the negative-going phase B pulses, which coincide in point of time with the positive-going phase A pulses, tend to transfer conduction from transistor 90 to transistor 91 in flip-flop 88. Thus, each negative-going phase A pulse produces a voltage transition at output lead 104 of flip-flop 107. That transistion triggers one of the flip-flops 88 or 89 and one-half of a clock cycle later inverter pulses applied directly to flip-flop reset inputs by switch 83 restore the triggered flip-flop to its reset condition. Consequently the flip-flops 88 and 89 are alternately operated and a one-half cycle interval at the clock frequency elapses after the cycling of one flip-flop and before the cycling of the other flip-flop.

Two resistors 129 and 130 are connected in series between the collector electrodes of transistors 91 and 91′, and the common junction between these two resistors is connected to the output lead 131. When transistor 91 is conducting, its collector electrode is at a negative potential with respect to ground; and at the same time, if switch 83 is in the position illustrated, transistor 91′ is nonconducting and its collector electrode is at ground potential. Thus, output lead 131 is at a negative potential with respect to ground. When the conducting conditions of the two transistors are reversed, lead 131 is at a positive potential with respect to ground. When both transistors are either conducting or nonconducting at the same time, as is the case in certain operating modes to be described, lead 131 is at ground potential, since the resistors 129 and 130 will usually have resistances of equal magnitudes.

Output signals from lead 131 may be applied through a low-pass filter 132 to the terminals of a potential divider 133. A tap 136 on potential divider 133 couples such signals to an amplifier 137 which may be of the type shown, for example, in my copending patent application, Serial No. 144,464, filed October 11, 1961, which is entitled "Unbalanced-to-Balanced Amplifier." The balanced output of this amplifier appears at terminals 138 and 139. Different output wave configurations may be produced by operating switch 83 to vary the mode of operation of the test signal generator. Some typical wave configurations representing different modes of operation are illustrated in FIG. 2 adjacent to the dial indicator panel 83*d* of the selector switch 83.

When selector arms 86 and 87 are in the positions illustrated, the test signal generator is arranged to produce a bipolar test signal which includes all marks, or ONE's. This all-mark signal wave, which is shown adjacent to the indicator panel 83*d* drawn to the same time scale as a wave diagram of a sinusoidal clock input signal such as might be supplied by source 36, includes alternate positive-going and negative-going mark pulse excursions separated by zero voltage wave portions of one-half of a clock cycle duration each. Alternate polarity excursions for any one bit type are usually employed in the present state of the art for bipolar signals. Positive-going excursions occur when flip-flop 89 is operated and negative-going excursions occur when flip-flop 88 is operated.

The all-mark wave shown in FIG. 2 has a fifty percent duty cycle because the phase A and B waves are 180 degrees out of phase with one another. Clearly, any well-known circuits could be provided to produce other phase relationships between the phase A and B pulses and thereby produce different duty cycles. However, the duty cycle selected remains constant at all frequencies of operation as long as the circuits which establish the phase relationship are frequency insensitive, as in FIG. 1.

In all of the three bipolar positions indicated for switch 83, the phase A and phase B inverter output pulses are applied through switch 83 to reset flip-flops 88 and 89 as described. The information content of these bipolar waves may be controlled by regulating the operation of an n-p-n transistor 140 which operates as a shunting gate in FIG. 1. When this transistor is nonconducting, it presents a high shunt impedance to amplified phase A pulses in the input of trigger circuit 110 and has no important effect upon those pulses. However, when the transistor 140 is biased for conduction, it presents a low shunt impedance to those pulses and bypasses them from the input of trigger circuit 110 through the collector-emitter path of transistor 140 to the negative supply terminal. In some circuits the lead arrangement may be such that it will be advantageous to add a bypass capacitor 141 from the emitter electrode of transistor 140 to ground to avoid cross-talk among the various circuits connected to the negative supply lead.

Transistor 140 is normally biased nonconducting since its base and emitter electrodes are connected to the same negative supply terminal, with the emitter electrode being directly so connected and the base electrode being connected through a resistor 142. This is the condition in which transistor 140 exists when switch 83 is operated to the position illustrated. The information content of output signals at terminals 138 and 139 may be controlled by controlling the conductivity of transistor 140. Several different signal contents will be discussed.

When switch 83 is operated to the random bipolar position, selector arm 143 of switch deck 83*c* in FIG. 1 connects the base electrode of transistor 140 to the positive supply terminal through a resistor 135 and a rheostat 145, and to the output of a noise generating circuit 146. Transistor 140 is normally biased for conduction, and noise generator 146 supplies pulses for biasing transistor 140 nonconducting in a random manner. Each time that transistor 140 is biased nonconducitng, which occurs in a random manner, phase A inverter pulses are passed to the trigger circuit 110.

The noise generator 146 includes a transistor 147 with its collector electrode connected by a resistor 148 to the positive supply terminal. The emitter electrode of this transistor is connected to the negative supply terminal through a rheostat 149 connected in series with a resistor 150. A reverse breakdown diode 151 is connected in series with a resistor 152 between the base electrode of transistor 147 and the positive supply terminal to provide noise signal currents to the transistor. Diode 151 could of course, be any suitable noise source; but it has been found convenient to use a reverse breakdown diode of the well-known type which is characterized by essentially constant potential difference between its terminals when biased for reverse conduction of electric current. It is well known that when such diodes are biased at the knee of their reverse conduction characteristic they are quite noisy, and diode 151 is so biased. The noise currents from diode 151 are injected in the base electrode of transistor 147 to vary the conduction through the transistor. A capacitor 153 bypasses the noise component of the emitter current away from the potential supply source terminals and back to diode 151. Rheostat 149 may be adjusted to fix the bias for diode 151 and to control the output magnitude of the noise signals from transistor 147 by varying the bias around the knee of the diode characteristic. Noise signals are coupled from the collector electrode of the transistor 147 through a capacitor 156 to the base electrode of a common-emitter connected amplifier-limiter transistor 157.

Two resistors 158 and 159 are connected in series between the positive and negative supply terminals and are proportioned so that the common junction between the resistors, which is connected to the base electrode of transistor 157, is at a positive potential with respect to the emitter electrode of that transistor. In the absence of a negative pulse from the noise generator 146, transistor 157 is normally conducting. A resistor 160 connects the collector electrode of transistor 157 to the positive supply terminal, and resistors 161 and 162 are connected in series between the negative supply terminal and the emitter electrode of transistor 157. A capacitor 163 bypasses noise signals from the emitter circuit back to the collector circuit of transistor 157 to prevent such signals from entering the operating potential supply source.

Amplified and limited noise pulses at the collector electrode of transistor 157 are coupled through a capacitor 166 and a resistor 167, and through a selector arm 143 of switch deck 83*c*, to the base electrode of transistor 140 for biasing that transistor into a nonconducting condition.

The randomly occurring noise pulses from noise generator 146 permit certain of the phase A inverter pulses to pass to trigger circuit 110. Such pulses produce synchronously random operation of the test signal generator. A typical portion of a resulting random output test signal is illustrated adjacent to the random bipolar terminal of switch panel 83*d* and includes successive bits of space-mark-mark-space-space-mark. Each space interval in this wave represents a clock interval during which gate transistor 140 was actuated to shunt phase A pulses, and each mark interval indicates that transistor 140 was not shunting a negative-going phase A pulse. The marks are represented by alternate positive and negative output pulse excursions regardless of whether the marks follow one another in succession or are spaced from one another by one or more space bits.

Other asymmetrical output signal patterns can be produced by replacing noise generator 146 with other sources. For example, another clutched oscillator adapted for frequency changing and locked to the output of oscillator 37 could have its dividing ratio and phase with respect to oscillator 37 adjusted to produce different patterns.

If it is desired now to generate a symmetrical bipolar test signal which includes alternate marks and spaces, the selector arm 169 of switch indicator panel 83*d* is rotated to the 101010 position. The corresponding location of selector arm 143 in switch deck 83*c* causes an output of a p-n-p flip-flop circuit 170 to be connected through a resistor 171 to the base electrode of transistor gate 140. Flip-flop 170 has its two input connections coupled together through a capacitor 172 in the same manner as previously described for flip-flop 107, and the phase A output of inverter transistor 76 is applied to these inputs of the flip-flop 170. Thus, alternate positive-going phase A inverter pulses drive flip-flop 170 to a stable conducting condition which places a positive bias on the base electrode of transistor 140. This transistor shunts the corresponding phase A pulse, and its following negative-going phase A pulse, to ground. The intermediate positive-going phase A pulses restore the flip-flop and remove the shunt. Now, since only alternate phase A negative pulses can reach trigger circuit 110, the frequency of the mark signals in the output of the test signal generator is reduced and this output includes alternate mark and space signals of the bipolar configuration illustrated next to the 101010 terminal of switch panel 83*d*.

When it is desired to produce unipolar test signal output, switch 83 is operated to the unipolar portion of its indicator panel 83*d*; and in this condition output voltage transitions on a lead 105 of the flip-flop 107 are coupled through switch decks 83*a* and *b* and through the capacitors 173 and 176 to the reset inputs of flip-flop circuits 88 and 89. Capacitor 176 prevents direct-current coupling between the reset inputs of those flip-flops. Now, each time that flip-flop 107 is triggered the contraphasal voltage transitions on its output leads 104 and 105 cause one of the flip-flops 88 or 89 to be set, while the other one of the two flip-flops is reset. No further change takes place in the conditions of these two flip-flops until another pair of contraphasal voltage transitions occurs in the output of flip-flop 107. Output lead 131 now sees transistors 91 and 91′ always in different conduction conditions and also changing conduction conditions at the same time. Accordingly, the voltage at lead 131 is either positive or negative with respect to ground and is only at ground potential during voltage transitions between the positive and negative levels.

If a unipolar output signal with alternate marks and spaces is desired, selector arm 169 is rotated to terminal 101010 in the unipolar range and transistor gate 140 is disabled. Accordingly, flip-flop circuits 88 and 89 are alternately set and reset in the manner just described to produce the test signal wave illustrated adjacent to the unipolar 101010 terminal of switch deck 83*c*.

When a random unipolar signal is to be produced, selector arm 169 is rotated to the random unipolar position, thereby causing selector arm 143 to connect the base electrode of transistor gate 140 to the output of noise generator 146 once more. The circuit now operates in the manner described for the unipolar alternate mark and space word, except that random ones of the phase A clock pulses are shunted away from trigger circuit 110 so that the mark-space transitions do not occur in a regular manner. A typical unipolar random output wave is illustrated adjacent to the unipolar random terminal of switch deck 83*c* for the same random condition previously described in connection with the bipolar signals wherein the first, fourth, and fifth phase A negative pulses are shunted.

Summarizing the test signal generator capabilities, the input signals receivable may include a wide variety of amplitudes and frequencies, but the output of clutched oscillator 37 always has the same rectangular configuration at the synchronizing input frequency of source 36.

Clutched oscillator 37 may, however, be connected to operate independently for generating output signals of the mentioned rectangular configuration, but at a selected independent stable frequency. These rectangular signals from clutched oscillator 37 are utilized in the test signal generator of FIGS. 1 and 2 to produce a variety of test output signal configurations at output terminals 138 and 139. Such test output signals may be either bipolar or unipolar, depending upon whether the flip-flop circuits 88 and 89 are connected to be reset by pulses derived from the inverter transistor 76 or from the flip-flop circuit 107. Duty cycle in the output signal is stable at any chosen value regardless of the output frequency of oscillator 37.

The information content of the test signals at terminals 138 and 139 is a function of the control exercised over input pulses which are applied to flip-flop circuits 88 and 89. The use of the transistor shunting gate 140 with an appropriate drive causes the test signal output to be either random or cyclic in nature.

Although the present invention has been described in connection with a particular embodiment thereof, it is to be understood that modifications of this embodiment, as well as other embodiments utilizing the underlying principles of the invention, are included within the spirit and scope of the invention.

What is claimed is:

1. A test signal generator comprising a sinusoidal voltage generator, means deriving from the output of said voltage generator contraphasal waves of spaced impulses, a first multivibrator circuit, means applying impulses of a first one of said waves for triggering said multivibrator, a second multivibrator using n-p-n transistors and having first and second input connections, a third multivibrator using p-n-p transistors and having first and second input connections, means applying a first output of said first multivibrator to the first inputs of said second and third multivibrators, an output circuit combining the outputs of said second and third multivibrators, and selector means applying impulses from one of said waves or from said first multivibrator to the second inputs of said second and third multivibrators.

2. A test signal generator comprising a source of oscillations of widely variable amplitude and frequency, a clutched oscillator connected to receive said oscillations, means connected to the output of said clutched oscillator producing spaced pulses, two bistable circuits having complementary triggering characteristics, means responsive to said spaced pulses coupling triggering signals to said bistable circuits, and means combining the outputs of said bistable circuits into a single circuit.

3. A test signal generator comprising a source of oscillations of widely variable amplitude and frequency, a clutched oscillator connected to receive said oscillations, means connected to the output of said clutched oscillator and producing trains of spaced pulses, two bistable circuits having complementary triggering characteristics, each of said bistable circuits having a separate input connection to receive pulses for triggering the bistable circuit to each one of its stable conduction conditions, means responsive to a first one of said pulse trains and connected to apply triggering signals to a first input of each of said bistable circuits, means connecting triggering signals to a second input of each bistable circuit in response to said trains of spaced pulses, and means combining the outputs of said bistable circuits into a single circuit.

4. A test signal generator comprising two bistable circuits having complementary triggering characteristics, a source of pulses, means coupled to said source and responsive to a portion of the pulses from said source for actuating said bistable circuits alternately, connections applying to the actuated one of said bistable circuits a restoring signal in response to said pulses, and means combining the outputs of said bistable circuits.

5. The test signal generator in accordance with claim 4 in which said source provides two pulse train outputs of opposite phase, said actuating means receives one of said pulse train outputs, and said connections include means coupling each of said pulse train outputs to restore a different one of said bistable circuits.

6. The test signal generator in accordance with claim 5 in which said actuating means includes a third bistable circuit, means coupling pulses from a first of said pulse train outputs to actuate said third bistable circuit from either of its conduction conditions to the other, said third bistable circuit having its output connected to actuate said two bistable circuits in alternation, and said connections including selecting means coupled to each of said two bistable circuits for restoring an actuated one of the two bistable circuits either by an output of said third bistable circuit to produce unipolar signals in the combined output of said two bistable circuits or by one of said pulse train outputs to produce bipolar signals in said combined output.

7. The test signal generator in accordance with claim 4 in which said actuating means includes a pulse gate connected for diverting pulses of said source to prevent operation of said bistable circuits, and means operating said gate to control the manner of coupling pulses from said source to actuate said two bistable circuits.

8. The test signal generator in accordance with claim 7 in which said gate operating means comprises a bistable circuit responsive to said pulses and connected to enable said gate for diverting predetermined ones of said pulses.

9. The test signal generator in accordance with claim 7 in which said gate operating means comprises a noise pulse generator, and means applying noise pulses from said generator to enable said gate for diverting randomly selected ones of said pulses.

10. The test signal generator in accordance with claim 9 in which said gate operating means further comprises a third bistable circuit responsive to said source pulses for producing enabling signals for said gate to divert predetermined ones of said pulses, and in which said noise pulse applying means comprises means selectively coupling the output of either said third bistable circuit or said noise pulse generator to said gate.

11. The test signal generator in accordance with claim 9 in which said noise pulse generating means comprises an amplifier having at least an output electrode and an input control electrode, a reverse breakdown diode, means biasing said diode at the knee of its reverse breakdown characteristic for producing noise pulses, and means connecting said diode to said control electrode for producing amplified noise pulses at said output electrode.

12. A test signal generator comprising two bistable circuits having complementary triggering characteristics, each of said bistable circuits having two input connections to which triggering signals may be applied for actuating the bistable circuit from either of its stable conduction conditions to the other, a source of pulses, means connected to said source for producing contraphasal versions of the pulses from said source, a multivibrator circuit, means responsive to one of said pulse versions driving said multivibrator to produce further contraphasal pulse signal outputs at a lower frequency, means combining the outputs of said two bistable circuits, means applying one of the contraphasal outputs of said multivibrator to a first one of the input connections of each of said bistable circuits, and selecting means connected to the second input connections of said bistable circuits for applying to said bistable circuits either for coupling to both of said second inputs of said bistable circuits the other one of said multivibrator output signals to produce unipolar signals in the combined outputs of said bistable circuits, or for coupling to each of said second inputs a different one of the said contraphasal pulse versions to produce bipolar signals in the combined outputs of said bistable circuits.

13. A test signal generator in accordance with claim 12 in which said source of pulses comprises an amplifier, a positive feedback path from the output to the input of said amplifier, said feedback path including tunable means to produce sustained oscillations at the amplifier output, negative feedback means in said amplifier limiting the amplitude of both the positive-going and negative-going excursions of said oscillations, and differentiating means producing positive-going and negative-going spaced pulses in response to the limited oscillations in the output of said amplifier.

14. A test signal generator in accordance with claim 12 in which said source comprises means supplying sinusoidal oscillations that are subject to changes in amplitude and shifts in frequency, a clutched oscillator including first and second amplifier stages connected in tandem to the output of said oscillation supply means, a positive feedback path from the output of said second amplifier stage to the input of said first amplifier stage to induce oscillation in said amplifier stages, and negative feedback means between the output of said first stage and the input of said first stage to limit positive-going and negative-going excursions of signals in the output of said first stage to the linear region of operation of the stage, and differentiating means producing positive-going and negative-going spaced pulses in response to the amplified and limited oscillations appearing in the output of said second stage.

15. A test signal generator comprising two bistable circuits having complementary triggering characteristics, each of said bistable circuits having first and second input connections that are electrically independent of the input connections to the other so that the triggering of each bistable circuit is independent of the triggering of the other, a source of positive-going polarity and negative-going polarity pulses for operating said bistable circuits, means responsive to at least a portion of one polarity of said pulses applying triggering signals to the first input connection of both of said bistable circuits for alternately actuating such circuits, means responsive to pulses from said source applying triggering signals to the second inputs of said bistable circuits for resetting the actuated circuit, and means combining signals from an output of each of said bistable circuits.

16. A test signal generator for converting sinusoidal input signals into a selectable one of a plurality of output signal configurations, said generator comprising means generating voltage impulses at the zero-voltage axis-crossings of said sinusoidal signals, plural bistable switching means each having stable set and reset conditions, an output circuit connected to combine the outputs of said switching means, and means selectably controllable for coupling said impulses to actuate said switching means in different orders for varying the configuration of the combined outputs.

17. A test signal generator comprising two multivibrators employing translating devices of complementary conduction characteristics, each of said multivibrators having two conduction conditions in which it operates in response to the application of triggering signals to first and second input connections thereof, respectively, a source of pulses, means deriving from said source a plurality of trains of pulses having different phase relationships with respect to one another, means applying first train of said pulses as triggering signals to the first inputs of both multivibrators, means selectively coupling to the second inputs of said multivibrators different ones of said pulse trains so that each coupled pulse tends to cause the triggering of only one of said multivibrators, and means combining the outputs of said multivibrators whereby a single output signal is produced which has polarity characteristics related to the relative phasing of said pulse trains coupled to said multivibrator.

18. A test signal generator comprising two bistable circuits having complementary triggering characteristics, a source of short duration positive and negative pulses, means responsive to certain ones of said pulses generating long duration pulses, means coupling each long pulse to one input of each of said bistable circuits, said coupling means being adapted so that the leading edge of each pulse tends to actuate one of said bistable circuits and the trailing edge tends to actuate the other bistable circuit, and means restoring each bistable circuit in response to one of said short duration pulses.

19. A test signal generator comprising two bistable trigger circuits, each having first and second input connections, corresponding input connections of each of said trigger circuits having complementary triggering signal response characteristics whereby the input circuits of one bistable circuit are responsive to positive-going triggering signals and the input circuits of the other trigger circuit are responsive to negative-going signals, a source of pulses, means deriving contraphasal versions of the pulses from said source, means applying a first one of said pulse versions to the first inputs of said trigger circuits in multiple, means applying a second one of said versions to the second inputs of said trigger circuits in multiple, and means combining the outputs of said bistable trigger circuits.

20. A test signal generator comprising two bistable circuits having complementary triggering characteristics, a source of positive-going and negative-going pulses for operating said trigger circuits, means responsive to at least a part of said pulses of one polarity generating further pulses of longer duration, a connection applying said further pulses to a first input of both of said trigger circuits to operate such circuits in sequence, means applying said positive-going and negative-going pulses to second inputs of said bistable circuits for restoring the operated one thereof, and means combining signals from the outputs of both of said bistable circuits.

21. A test signal generator producing an output of selectable polarity characteristics and information content, said generator comprising a source of recurring spaced positive-going and negative-going pulses, a first inverter circuit receiving said pulses and producing at different output connections two corresponding trains of recurring pulses of different phase, means coupled to one of said inverter output connections for producing contraphasal output voltage transitions between two predetermined voltage levels at different output connections in response to each pulse of a predetermined polarity at said one inverter output connection, first and second bistable multivibrators, each including two transistors connected for operation as a bistable circuit so that only one transistor conducts at a time, and an input connection for each transistor, which connection includes a diode poled to couple to such transistor only those input signals tending to reduce conduction in the transistor, the transistors of the first multivibrator being of opposite conductivity type with respect to the transistors of said second multivibrator, means applying said transitions of one phase to an input diode of one transistor in each of said multivibrators, signal selecting means connected to an input diode of the other transistor in each of said multivibrators for either applying to both multivibrators the other phase of said voltage transitions or applying to each of said multivibrators a different one of the outputs of said inverter, and means combining the multivibrator outputs from the transistors receiving the transitions of said one phase to produce unipolar signals when the multivibrators receive said other transition phase and bipolar signals when the multivibrators receive through said selecting means the inverter outputs.

22. A test signal generator comprising means supplying a first train of voltage impulses, means responsive to said first impulse train producing at least two additional trains of voltage impulses having a predetermined phase displacement therebetween which is independent of the frequency of impulses in said first train, a multistable trigger circuit comprising two bistable circuits each having a set and a reset stable condition of operation, means responsive to one of said additional trains of impulses triggering said bistable circuits alternately to their set stable operating conditions, means responsive to said additional trains of impulses triggering the set bistable circuit to its reset condition, and means deriving from said multistable circuit a test signal wave with a duty cycle which is a function of said phase displacement.

References Cited by the Examiner

UNITED STATES PATENTS

| | | | |
|---|---|---|---|
| 2,794,123 | 5/57 | Younker | 328—190 X |
| 3,027,464 | 3/62 | Kosonocky | 307—88.5 |
| 3,043,964 | 7/62 | Seidman | 307—88.5 |

ARTHUR GAUSS, *Primary Examiner.*

JOHN W. HUCKERT, *Examiner.*